United States Patent [19]

Tomasello

[11] Patent Number: 4,622,714
[45] Date of Patent: Nov. 18, 1986

[54] FLUID STRIPPING APPARATUS

[75] Inventor: Anthony J. Tomasello, Allison Park, Pa.

[73] Assignee: Sherman Industries, Inc., Palmyra, N.J.

[21] Appl. No.: 725,041

[22] Filed: Apr. 19, 1985

[51] Int. Cl.$^4$ .............................................. B60S 3/04
[52] U.S. Cl. .................................. 15/316 R; 15/405; 239/589; 239/597
[58] Field of Search ............. 15/316 R, 405; 239/589, 239/592, 594, 597

[56] References Cited

U.S. PATENT DOCUMENTS

| | | | |
|---|---|---|---|
| 1,583,528 | 5/1926 | Clements | 15/28 |
| 2,271,327 | 1/1942 | Chirgwin | 93/79 |
| 2,440,157 | 4/1948 | Rousseau | 15/316 R |
| 2,448,834 | 9/1948 | Rousseau | 34/243 |
| 2,827,060 | 3/1958 | Marty | 15/405 X |
| 3,191,210 | 6/1965 | Fischer | 15/316 R X |
| 3,570,042 | 3/1971 | Solomon | 15/316 R |
| 3,903,562 | 9/1975 | Miles | 15/301 |
| 3,921,915 | 11/1975 | Glenn et al. | 239/589 |
| 4,114,230 | 9/1978 | MacFarland | 15/405 X |
| 4,161,801 | 7/1979 | Day et al. | 15/316 R |

FOREIGN PATENT DOCUMENTS 2260918 6/1973 Fed. Rep. of Germany ...... 239/589

Primary Examiner—Chris K. Moore
Attorney, Agent, or Firm—Seidel, Gonda, Goldhammer & Abbott

[57] ABSTRACT

Apparatus for stripping rinse water from a vehicle in a car wash has a nozzle with an inlet, an elongated body portion and an outlet. The body portion converges inwardly longitudinally from the inlet to the outlet and terminates in a straight section adjacent the outlet. The nozzle provides a highpressure, high-volume air flow at low horsepower.

14 Claims, 14 Drawing Figures

FLUID STRIPPING APPARATUS

BACKGROUND OF THE INVENTION

The present invention relates to fluid stripping apparatus, and in particular apparatus for stripping rinse water from a vehicle in a car wash at low horsepower by directing air against the vehicle at high velocity and high pressure without the apparatus touching the vehicle's surface.

Using air to physically strip rinse water from a vehicle in a car wash is well-known. For example, U.S. Pat. Nos. 2,448,834, 3,903,562 and 4,161,801 all disclose apparatus for drying vehicles in a carwash by using forced air blown through a nozzle to strip water from the vehicle surfaces as opposed to evaporating the water. To physically strip rinse water from a vehicle, the air must be delivered at a sufficient pressure, velocity and volume. It is well known that the pressure, velocity and volume can be increased by bringing the air emitting nozzle close to the surface of the vehicle. By reducing the distance between the nozzle and the vehicle surface, the horsepower of the blower motors which force the air through the nozzle can be reduced. This, in turn, enables the drying apparatus to operate more quietly and at lower energy consumption.

In the limit, the nozzle actually touches the vehicle surface. For example, U.S. Pat. No. 2,448,834 discloses a motor vehicle drying apparatus with flexible T-shaped conduits which rest on the surface of a vehicle to be stripped of water. The T-shaped conduits have an elongated nozzle opening at one end for directing air against the surface of the vehicle. The air from the nozzles at the end of the T-shaped conduits "squeegees", or strips, the water from the vehicle.

U.S. Pat. No. 4,161,801 discloses another vehicle drying apparatus for stripping rinse water from a vehicle which uses flexible conduits having an elongated nozzle at one end. Like the nozzles in the flexible T-shaped conduits in U.S. Pat. No. 2,448,834, the nozzles in the flexible conduits in U.S. Pat. No. 4,161,801 ride on the surface of the vehicle to be dried and direct air against the vehicle surface to physically strip the water from the surface. The apparatuses disclosed in these patents both strip rinse water from a vehicle by placing an air-emitting nozzle right on the vehicle's surface to take advantage of the well-known property that the air velocity and pressure are greatest in the immediate vicinity of the nozzle.

These prior apparatuses, however, are not without their drawbacks. There is considerable reluctance on the part of many car wash customers to permit a nozzle to drag on the surface of their automobiles. In addition, vehicle dryers which use flexible conduits like those disclosed in U.S. Pat. Nos. 2,448,834 and 4,161,801 tend to have high maintenance costs because the flexible conduits are susceptible to tearing and the nozzles, because of repeated contact with vehicles, tend to break.

A better approach is to keep the nozzles off the surface of the vehicle entirely. This approach, of course, makes it necessary to project air with sufficient velocity, pressure and volume onto the surface to be stripped to achieve the desired "squeegee" effect.

Modern car washes typically are designed to handle on the order of 120 vehicles per hour, or approximately one vehicle every 30 seconds. To air-strip vehicles at such a rapid rate, contact velocities (i.e., the velocity of air striking the vehicle surface) of 8,000 to 10,000 feet per minute are necessary. Conventional strippers which do not physically touch the vehicles can achieve the necessary air contact velocities only by using high-horsepower blower motors. Such fluid strippers therefore consume large amounts of power and can be expensive to operate.

Moreover, even though these conventional strippers do not physically contact the vehicles, they must still get fairly close (2 to 3 inches) to the vehicle surface to effectively strip it of water. Since surface contours of an automobile change greatly along its length (e.g., from hood to roof to rear deck) and vary drastically from vehicle to vehicle, elaborate "follower" systems have been devised to enable the air nozzles of conventional systems to follow the vehicle contours and maintain a fixed distance between the nozzle opening and the changing contours of the vehicle surface. These "follower" strippers are complex and costly to manufacture and maintain.

A further disadvantage of conventional strippers is that conventional nozzles are inefficient, and are not properly designed to minimize velocity dissipation and jet divergence. This is one reason why "follower" strippers were developed. Conventional nozzles are incapable of delivering the required contact velocity except over very short distances. Prior attempts to minimize velocity dissipation and jet divergence utilized external flaps and deflectors on nozzles to influence the air flow external to the nozzle. This solution is self-defeating, since velocity dissipation and jet divergence result from energy loss of the air. Flaps or deflectors only serve to further rob the air of energy, thus actually increasing velocity dissipation and jet divergence.

It is an object of the present invention to provide a fluid stripping apparatus which projects air from a nozzle much further than conventional apparatus without appreciable loss of velocity to deliver a high-volume, high-pressure flow of air at low horsepower and which can strip fluids from a surface at a distance.

It is another object of the invention to provide a fluid stripping apparatus which minimizes velocity dissipation and jet divergence of air emitted from a nozzle without the need for external attachments.

It is another object of the invention to provide a fluid stripping apparatus which eliminates the need to "follow" vehicle contours in order to effectively strip the vehicle surfaces.

These and other objects and advantages of the invention will appear hereinafter.

SUMMARY OF THE INVENTION the present invention is a nozzle having an inlet, an elongated body portion and an outlet. The body portion tapers longitudinally from the inlet toward the outlet and terminates in a straight section adjacent the outlet. The transverse cross-section of the body portion is generally circular at all points along the longitudinal axis of the nozzle. The diameter of the inlet is approximately three times larger than the diameter of the outlet. The straight section has a diameter approximately equal to the diameter of the outlet and a length approximately six-tenths the diameter of the outlet. The overall length of the nozzle is approximately four times the diameter of the outlet.

The present invention includes an apparatus for stripping fluid from the surface of an object. The apparatus comprises an array of nozzles in accordance with the invention spaced apart from the surface for directing air against the surface. In a preferred embodiment of the invention, the invention includes apparatus for stripping rinse water from vehicles as they are conveyed through a carwash, comprising an array of nozzles in accordance with the invention spaced apart from the vehicles for directing air against the top and side surfaces of the vehicle.

DESCRIPTION OF THE DRAWINGS

For the purpose of illustrating the invention, there is shown in the drawings a form which is presently preferred; it being understood, however, that this invention is not limited to the precise arrangements and instrumentalities shown.

DESCRIPTION OF THE INVENTION

Figure 1:
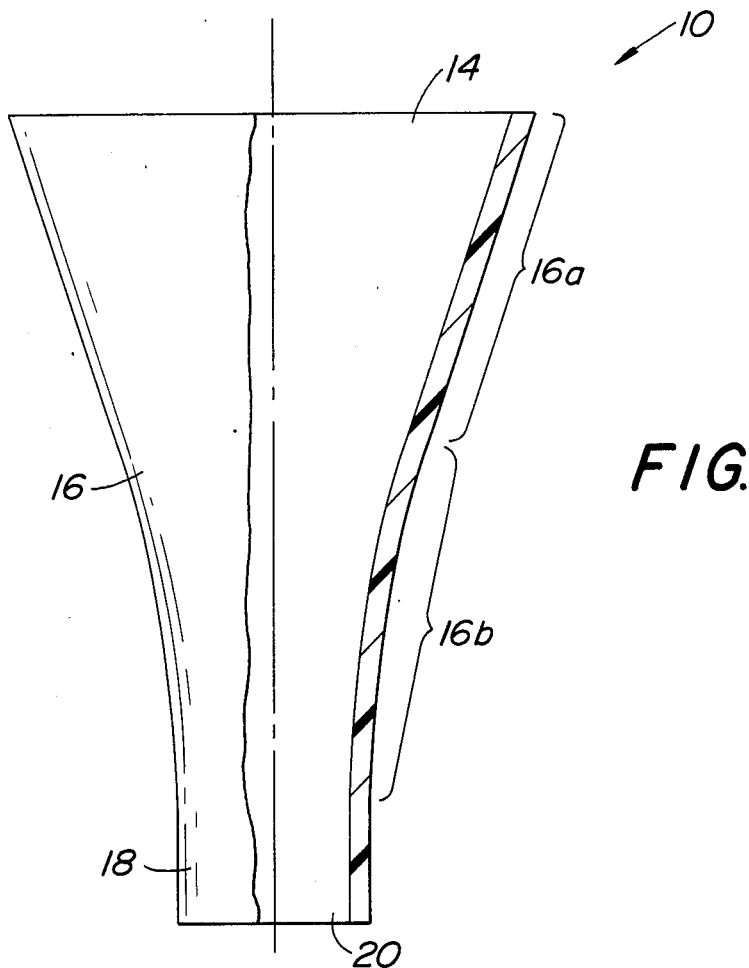
FIG. 1 is an elevational view in partial section showing a nozzle in accordance with one embodiment of the present invention.

Referring now to the drawings, wherein like numerals indicate like elements, there is shown in FIG. 1 a nozzle 10 in accordance with one embodiment of the present invention.

The nozzle 10 has an inlet 14 and an elongated inwardly-converging body portion 16 which terminates in a straight section 18 adjacent the outlet 20. Outlet 20 is sharply truncated in a plane perpendicular to the longitudinal axis of the nozzle. The walls of the nozzle are of uniform thickness everywhere along the nozzle. The interior surface of the nozzle 10 has a smooth contour, and the nozzle is preferably integrally molded in a single piece from a material such as Fiberglas (Trademark). Fiberglas (Trademark) is preferred over materials such as metal, for example, since Fiberglas (Trademark) tends to have a very smooth surface. This gives the nozzle a very low friction loss, i.e., there is no appreciable loss in air velocity as a result of friction between the air flowing through the nozzle and the interior surfaces of the nozzle. Although Fiberglas (Trademark) is preferred, any low-friction material, such as PTFE, may be used.

The transverse cross-section of each nozzle 10 is generally circular for all points along the longitudinal axis of the nozzle. The diameter of the circular cross-section decreases from inlet 14 in the longitudinal direction toward outlet 20. Thus, the body portion 16 is, in effect, a continuously tapering cone. The taper terminates in a straight portion 18, whose diameter remains constant for the length of the straight portion. The straight portion 18 itself terminates in nozzle outlet 20.

The constant diameter of straight section 18 is substantially equal to the diameter of nozzle outlet 20. Circular outlet 20 avoids exit losses which result from rectangular outlets since there are no corners to cause turbulence. This makes nozzle 10 very efficient.

The diameter of the inlet 14 is approximately three times the diameter of outlet 20. Thus, the ratio of nozzle outlet area to nozzle inlet area is approximately 0.11. This results in a uniform jet profile for the air emitted by the nozzle, since the air jet is uniform for outlet to inlet area ratios less than or equal to 0.376.

The overall length of the nozzle in the longitudinal direction from inlet to outlet is approximately four times the diameter of outlet 20. The longitudinal extent, or length, or straight section 18 is approximately six-tenths the diameter of outlet 20.

The taper of body portion 16 is smooth and continuous but does not necessarily follow a single geometric curve. Rather, the taper has two distinct portions. The first portion 16a begins at the inlet and is a substantially constant taper at an angle of about 20° with respect to a line parallel to the longitudinal axis. That is, the sides are substantially straight and inwardly converging. The first portion 16a of the taper extends for a longitudinal distance of approximately one and two-thirds times the diameter of the outlet 20, as measured from the plane of inlet 14. The second portion 16b of the taper begins at that point, and essentially follows an arc of a circle which has a radius approximately five times the diameter of outlet 20. The radius of curvature is centered at a point located upstream from outlet 20 a distance approximately six-tenths the diameter of outlet 20 and approximately five times the diameter of outlet 20 from the longitudinal center line of the nozzle. This second portion 16b provides a smooth transition from the first portion of the taper to the straight section 18 to minimize losses in the nozzle.

The divergence of the air jet emitted by the nozzle 10 is approximately 20° to 24°. This low divergence, coupled with the uniformity of the air jet as noted above, results in an extremely efficient nozzle. The local loss coefficient, which is a measure of nozzle loss from inlet to outlet, is on the order of 0.05, or only 5%. Thus, almost no losses occur in the nozzle itself.

In a preferred embodiment of the nozzle, the diameter of outlet 20 is approximately 4 inches. The diameter of the inlet end is approximately 11⅝ inches, the length of the straight section is approximately 2½ inches, and the overall length of the nozzle is approximately 17 inches. the radius of curvature of the second portion of the nozzle taper is approximately 22¾ inches, centered approximately 4 inches upstream from outlet 20 and approximately 22¾ inches from the longitudinal center line of the nozzle. It is believed that these dimensions provide optimum air velocity, air pressure and horsepower characteristics. At these dimensions, it is expected that the air stream exiting the nozzle will diverge to a diameter of only 19.2 inches at a distance of 24 inches from the outlet 20 without a significant loss in pressure or velocity.

Figure 2:
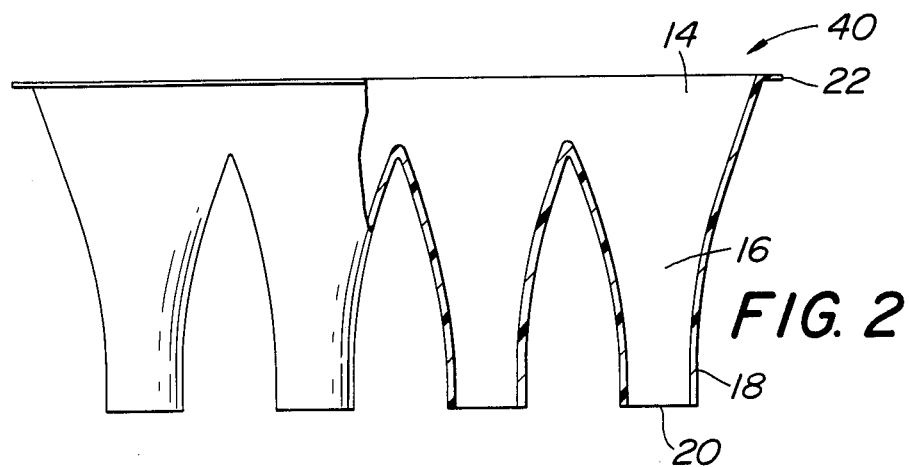
FIG. 2 is an elevational view in partial section showing an assembly of a plurality of nozzles in accordance with one embodiment of the present invention.
Figure 3:
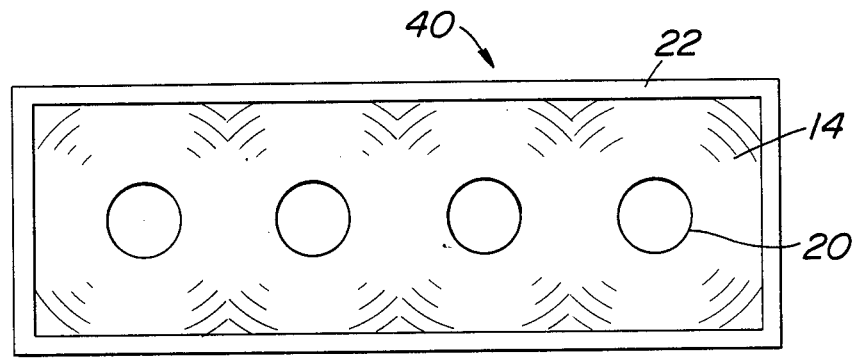
FIG. 3 is a top plan view of the nozzle assembly shown in FIG. 2.
Figure 4:
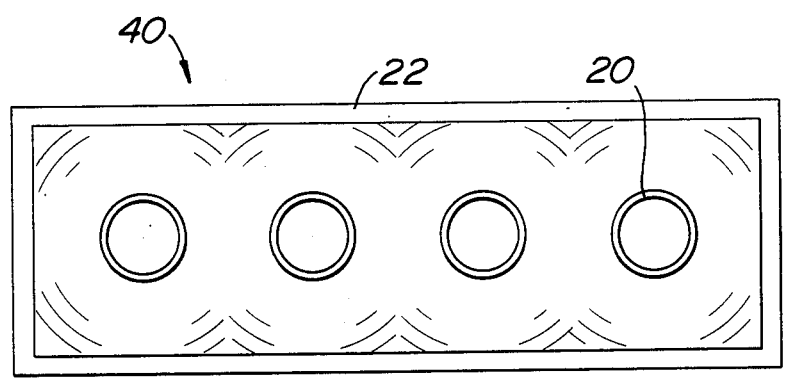
FIG. 4 is a bottom plan view of the nozzle assembly shown in FIG. 2.

In order to effectively strip rinse water from a vehicle in a car wash, a series of nozzle openings will be required to cover the entire vehicle surface. For this purpose, an assembly of nozzles in accordance with the invention is shown in FIGS. 2-4. For purposes of illustration, the nozzle assembly 40 has four individual nozzles 12 arranged in linear sequence so that the geometric center of each nozzle lies along a straight line. The geometric centers of the individual nozzles are uniformly spaced apart. Individual nozzles 12 are essentially identical to nozzle 10, except that the center-to-center spacing requires a slight modification to the walls of adjacent nozzle pairs. Although four individual nozzles are shown for purposes of illustration, any number of nozzles may be used as dictated by the particular application. A series of four nozzles centered 12 inches apart will provide an air stream approximately 60 inches in width at a distance of 24 inches from the outlets 20. A 60-inch-wide air stream should be adequate for most car wash applications. The cross-sectional shape of the air stream is generally elliptical.

Figure 5:
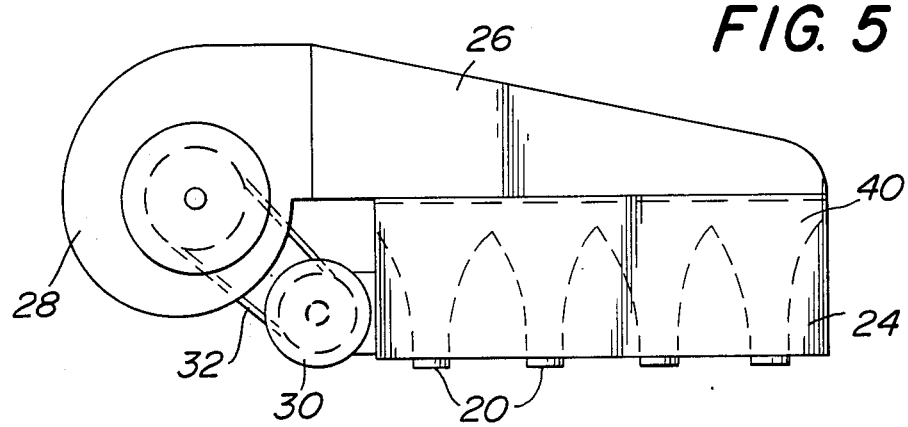
FIG. 5 illustrates a nozzle assembly as shown in FIG. 2 mounted in a housing and supplied with air via a plenum.

As shown in FIG. 5, a nozzle assembly 40 having four individual nozzles 12 can be mounted in a housing 24 to physically support the nozzle assembly. Air is supplied to the nozzle assembly through a tapered plenum 26 to which air is supplied by a blower, or impeller, 28. Air impellers are well-known and understood in the art, and need not be described in further detail. Impeller 28 may be driven by any suitable means such as an electric motor 30 via belt 32. Alternatively, impeller 28 may be driven directly from motor 30. Plenum 26 is tapered and decreases in cross section from the nozzle closest to impeller 28 to the nozzle furthest from impeller 28. The taper of plenum 26 cooperates with the nozzles to provide uniform pressure at the inlet to each nozzle. This ensures that each nozzle receives substantially the same volume of air from the impeller 28 so that each nozzle will deliver substantially the same output air pressure and volume characteristics for uniform stripping of vehicles.

Figure 7:
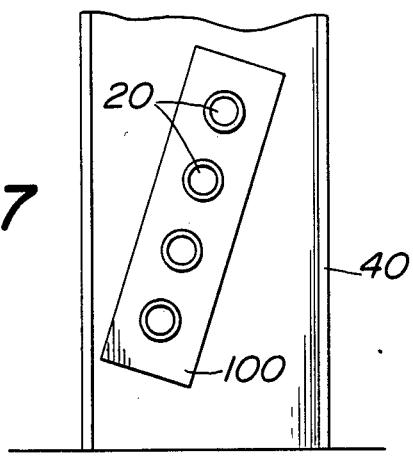
FIG. 7 is a sectional view taken along the lines 7—7 in FIG. 6.
Figure 6:
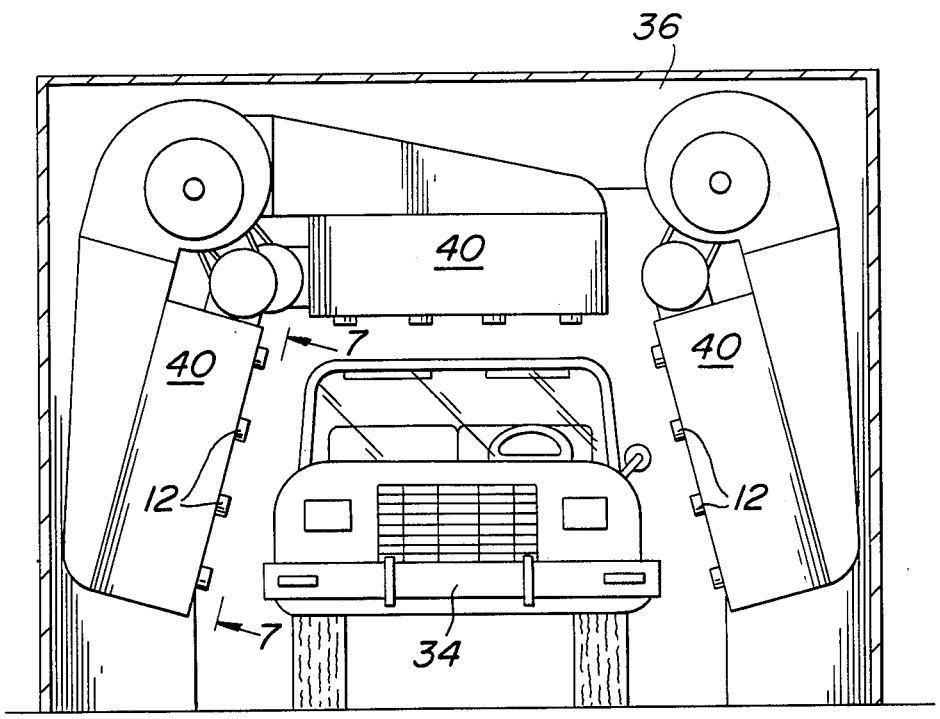
FIG. 6 illustrates the use of a plurality of nozzles in accordance with the present invention as they would be used in a car wash.

FIG. 6 illustrates the way in which three nozzle assemblies may be grouped to dry the entire surface of a vehicle 34 in a car wash. The nozzle assemblies are arranged to strip the top and left and right sides of a vehicle. The side nozzles are preferably canted at an angle to the vertical with the top nozzle being further rearward than the bottom nozzle to push water both downwardly and rearwardly with respect to the vehicle as it is conveyed past the nozzles by a conventional car wash conveyor (not shown). See FIG. 7.

It has been empirically determined that only 10 horsepower for each nozzle assembly, is sufficient to adequately strip an automobile.

A second embodiment of the present invention is illustrated in FIGS. 8-14, which correspond to FIGS. 1-7 of the first embodiment.

In the second embodiment, the nozzle 110 has an elongated, generally-rectangular slot 120 instead of a cylindrical outlet 20. That is, in the second embodiment, nozzle 110 relies on a single elongated opening rather than a series of circular openings to cover a surface to be stripped of fluid. In all other respects, nozzle 110 is identical to nozzle 10.

Figure 8:
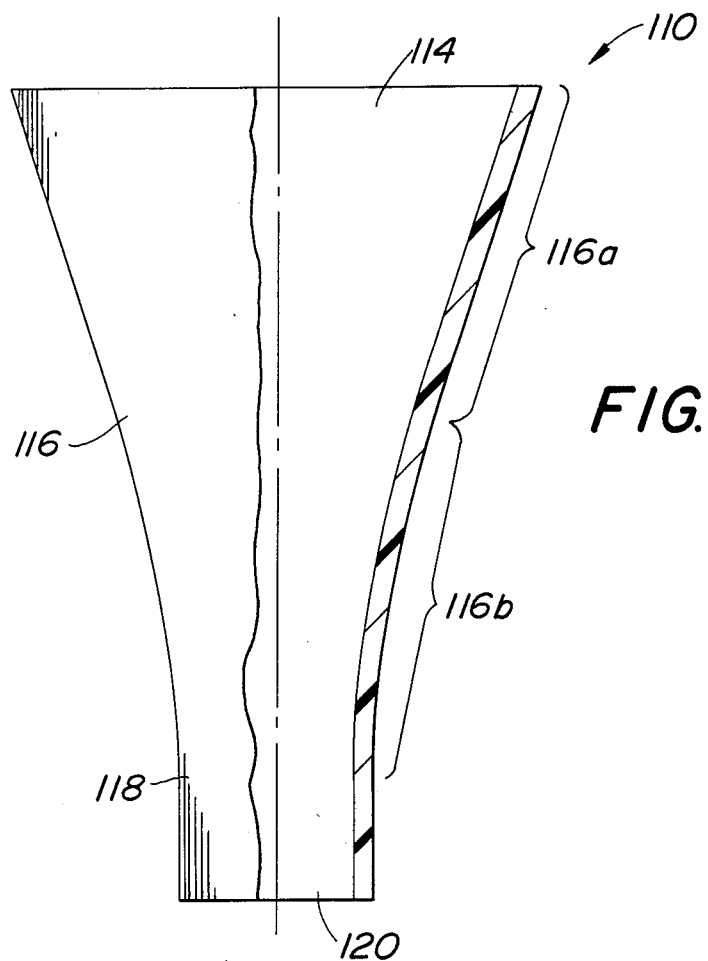
FIGS. 8-14 correspond to FIGS. 1-7 and illustrate a second embodiment of the present invention.
Figure 14:
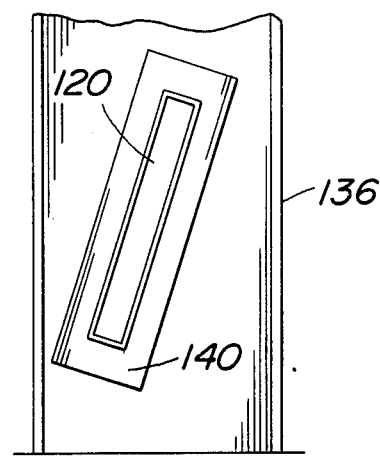
Figure 9:
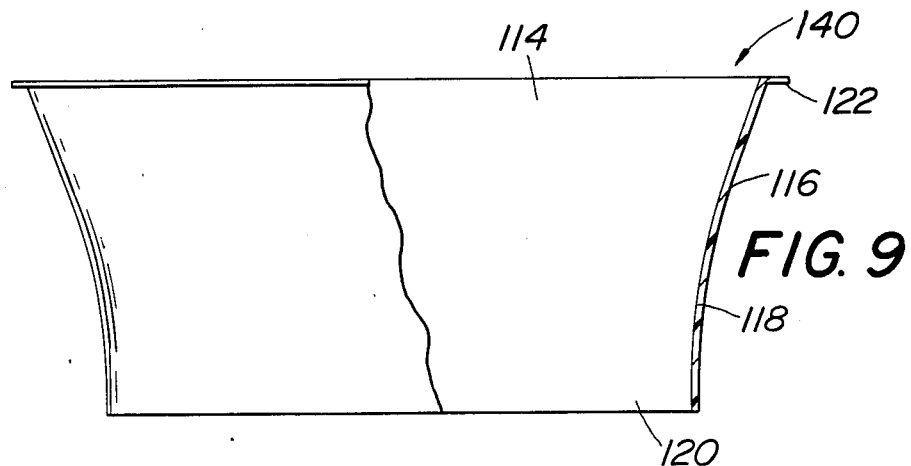
Figure 10:
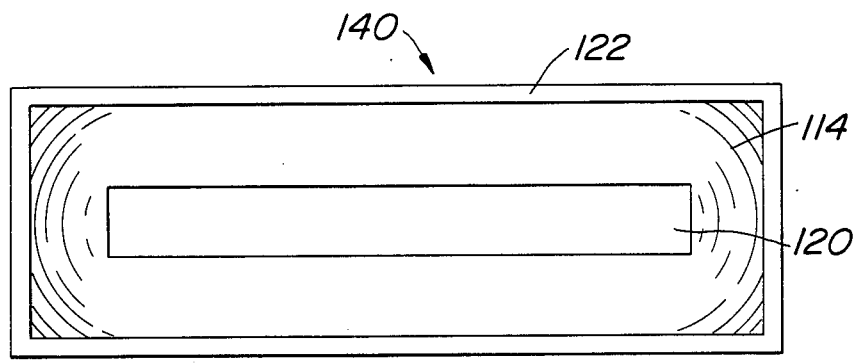
Figure 11:
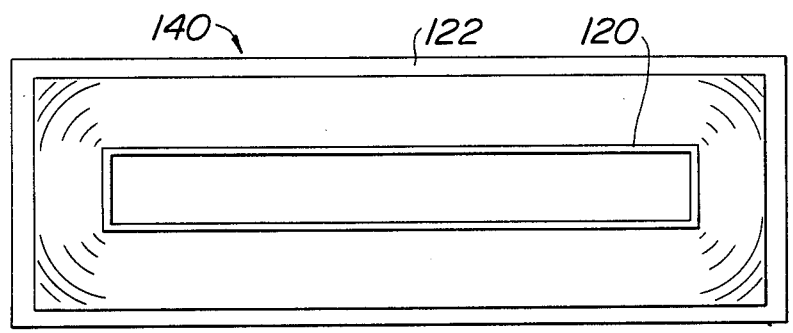

Referring particularly to FIG. 8, it can be seen that the transverse section of nozzle 110 is the same as the cross-section of nozzle 10 shown in FIG. 1.

The transverse cross-section of nozzle 110 decreases in width from inlet 114 toward slot 120. Thus, the body portion 116 continuously decreases in width. This taper of body portion 116 terminates in a straight portion 118, whose width remains constant for the length of the straight portion. The straight portion 118 itself terminates in slot 120. The constant width of straight section 118 is substantially equal to the width of slot 120.

Since slot 120 is generally rectangular, nozzle 110 will experience some exit losses due to turbulence in the corners of slot 120. However, it has been empirically found that any exit losses caused by slot 120 are virtually negligible. Thus, although nozzle 110 is not quite as efficient as nozzle 10, nozzle 110 is still highly efficient.

The width of the inlet 114 is approximately three times the width of slot 120. Thus, the ratio of slot area to nozzle inlet area is approximately 0.33. This results in a uniform jet profile for the air emitted by the nozzle, since the air jet is uniform for outlet to inlet area ratios less than or equal to 0.376.

The overall length of the nozzle 110 in the direction from inlet to outlet is approximately four times the width of slot 120. The length of straight section 118 is approximately six-tenths the width of slot 120.

The taper of body portion 116 is smooth and continuous but does not necessarily follow a single geometric curve. Rather, the taper has two distinct portions. The first portion 116a begins at the inlet and is a substantially constant taper at an angle of about 20°. That is, the sides are substantially straight and inwardly converging. The first portion 116a of the taper extends for a distance of approximately one and two-thirds times the width of the slot 120, as measured from the plane of inlet 114. The second portion 116b of the taper begins at that point, and essentially follows an arc of a circle which has a radius approximately five times the width of slot 120. The radius of curvature is centered at a point located upstream from slot a distance approximately six-tenths the width of slot and approximately five times the width of slot 120 from the center line of the nozzle. This second portion 116b provides a smooth transition from the first portion of the taper to the straight section 118 to minimize losses in the nozzle.

The divergence of the air jet emitted by the nozzle 10 is approximately 20° to 24°. This low divergence, coupled with the uniformity of the air jet as noted above, results in an extremely efficient nozzle.

Figure 12:
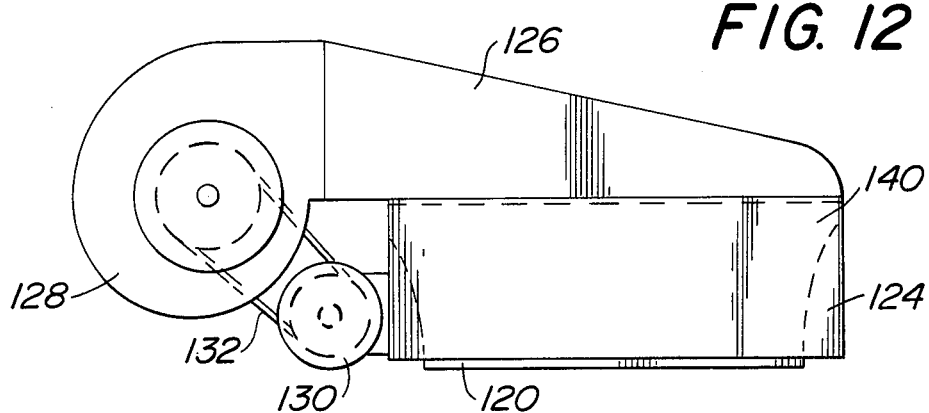

As shown in FIG. 12, a nozzle can be mounted in a housing 124 to physically support the nozzle 110. Air is supplied to the nozzle 110 through a tapered plenum 126 to which air is supplied by a blower, or impeller, 128. Plenum 126 is tapered and decreases in cross section from the point on nozzle inlet 114 closest to impeller 128 to the point on nozzle inlet 114 furtherest from impeller 28. The taper ensures that the slot receives substantially the same volume of air from the impeller along the entire length of slot 120 so that nozzle 110 will deliver substantially the same output air pressure and volume characteristics all along slot 120 for uniform stripping of vehicles.

Figure 13:
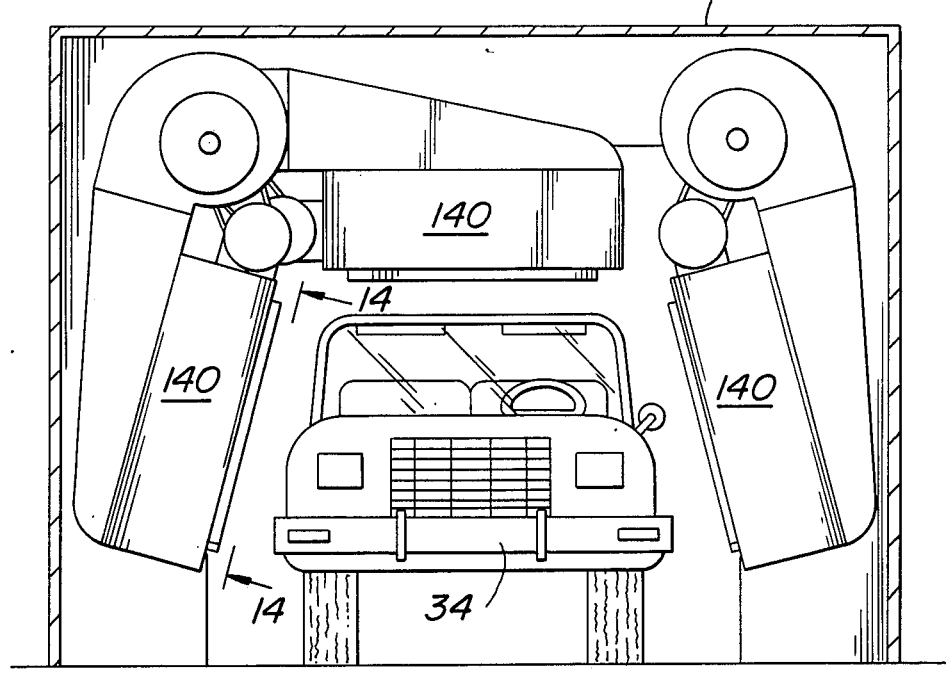

FIG. 13 illustrates the way in which three nozzles 110 may be grouped to dry the entire surface of a vehicle 34 in a car wash. The nozzles 110 are arranged to strip the top and left and right sides of a vehicle. The side nozzles are preferably canted at an angle to the vertical with the top of the nozzle being further rearward than the bottom of the nozzle to push water both downwardly and rearwardly with respect to the vehicle as it is conveyed past the nozzles by a conventional car wash conveyor (not shown). See FIG. 14.

The nozzle geometry provides uniform outlet airflow characteristics without requiring deflectors or other attachments to the nozzle to modify the air as it exits the nozzle. It is expected that, because of the high efficiency of the nozzle of the present invention, horsepower requirements for the impeller motor can be cut by two-thirds. Thus, the overall efficiency of a stripper using nozzles according to the invention is almost as great as a stripper using flexible conduits to place the nozzle on the vehicle surface, yet the disadvantages of the latter type of stripper are entirely avoided.

The present invention may be embodied in other specific forms without departing from the spirit or essential attributes thereof and, accordingly, reference should be made to the appended claims, rather than to the foregoing specification, as indicating the scope of the invention.

I claim:

1. A nozzle having an inlet, an elongated body portion and an outlet, the body portion tapering longitudinally from the inlet toward the outlet and terminating in a straight section adjacent the outlet, the transverse cross-section of the body portion being generally circular at all points along the longitudinal axis of the nozzle, the diameter of the inlet being approximately three times larger than the diameter of the outlet, the straight portion having a diameter approximately equal to the diameter of the outlet and a length approximately six-tenths the diameter of the outlet, the overall length of the nozzle being approximately four times the diameter of the outlet.

2. A nozzle according to claim 1, wherein the taper of the body portion has a first portion of substantially uniformly-decreasing cross-section and a second portion downstream of and contiguous with the first portion and curving along a substantially constant radius of curvature from the first portion to the straight section.

3. A nozzle according to claim 1, wherein the walls of the nozzle are sharply truncated at the outlet in a plane substantially perpendicular to the longitudinal axis of the nozzle.

4. A nozzle assembly comprising a plurality of individual nozzles disposed linearly, each nozzle having an inlet, an elongated body portion and an outlet, the body portion tapering longitudinally from the inlet toward the outlet and terminating in a straight section adjacent the outlet, the transverse cross-section of the body portion being generally circular at all points along the longitudinal axis of the nozzle, the diameter of the inlet being approximately three times larger than the diameter of the outlet, the straight portion having a diameter approximately equal to the diameter of the outlet and a length approximately six-tenths the diameter of the outlet, the overall length of the nozzle being approximately four times the diameter of the outlet.

5. A nozzle assembly according to claim 4, wherein the geometric center of each of said plurality of individual nozzles lies along a straight line.

6. A nozzle assembly according to claim 5, wherein said geometric centers are uniformly spaced apart.

7. A nozzle assembly according to claim 4, wherein the geometric ceners of said plurality of individual nozzles are uniformly spaced apart.

8. A nozzle assembly according to claim 4, wherein said assembly is integrally molded of glass fiber material.

9. Apparatus for stripping fluid from the surface of an object, comprising (a) an array of individual nozzles disposed linearly and spaced apart from said surface for directing air against said surface, the array having an elongated inlet and each nozzle having an inlet which communicates with the array inlet, an elongated body portion and an outlet, the body portion tapering longitudinally from the inlet toward the outlet and terminating in a straight section adjacent the outlet, the transverse cross-section of the body portion being generally circular at all points along the longitudinal axis of the nozzle, the diameter of the inlet being approximately three times larger than the diameter of the outlet, the straight portion having a diameter approximately equal to the diameter of the outlet and a length approximately six-tenths the diameter of the outlet, the overall length of the nozzle being approximately four times the diameter of the outlet, (b) producer means for providing a source of air under pressure, and (c) duct means having an inlet connected to the producer means and an outlet connected to the array inlet, the internal volume of the duct means decreasing linearly from one side of the array inlet to the other along the dimension of the array inlet.

10. Apparatus according to claim 9, wherein said nozzles are disposed at an acute angle with respect to said surface.

11. Apparatus for stripping rinse water from vehicles as they are conveyed through a carwash, comprising (a) an array of nozzles spaced apart from said vehicles for directing air against the top and side surfaces of the vehicle, the array having an elongated inlet and each nozzle having an inlet which communicates with the array inlet, an elongated body portion and an outlet, the body portion tapering longitudinally from the inlet toward the outlet and terminating in a straight section adjacent the outlet, the transverse cross-section of the body portion being generally circular at all points along the longitudinal axis of the nozzle, the diameter of the inlet being approximately three times larger than the diameter of the outlet, the nozzles for directing air rearwardly with respect to the vehicle as it is conveyed through the carwash and the nozzles for directing air against said side surfaces being disposed to direct air downwardly and rearwardly with respect to the vehicle, (b) producer means for providing a source of air under pressure, and (c) duct means having an inlet connected to the producer means and an outlet connected to the array inlet, the internal volume of the duct means decreasing linearly from one side of the array inlet to the other along the long dimension of the array inlet.

12. A nozzle having an inlet, a body portion and a generally rectantular outlet, the body portion tapering longitudinally from the inlet toward the outlet and terminating in a straight section adjacent the outlet, the cross-section of the body portion being generally rectangular, the area of the inlet being approximately three times larger than the area of the outlet, the straight portion having an area approximately equal to the area of the outlet and a length approximately six-tenths the short dimension of the outlet, the overall length of the nozzle from inlet to outlet being approximately four times the short dimension of the outlet.

13. A nozzle according to claim 12, wherein the taper of the body portion has a first portion of substantially uniformly-decreasing cross-section and a second portion downstream of and contiguous with the first portion and curving along a substantially constant radius of curvature from the first portion to the straight section.

14. A nozzle according to claim 12, wherein the walls of the nozzle are sharply truncated at the outlet in a plane substantially perpendicular to the longitudinal axis of the nozzle.

* * * * *